United States Patent [19]

De Schepper et al.

[11] 4,432,951
[45] Feb. 21, 1984

[54] PROCESS FOR SEPARATING GERMANIUM FROM AN AQUEOUS SOLUTION

[75] Inventors: Achille De Schepper, Lichtaart-Kasterlee; Marc Coussement, Hove; Antoine Van Peteghem, Olen, all of Belgium

[73] Assignee: Metallurgie Hoboken-Overpelt, Brussels, Belgium

[21] Appl. No.: 421,250

[22] Filed: Sep. 22, 1982

Related U.S. Application Data

[63] Continuation of Ser. No. 285,580, Jul. 21, 1981, abandoned.

[30] Foreign Application Priority Data

Jun. 22, 1981 [LU] Luxembourg .......................... 83448

[51] Int. Cl.³ ...................... B01D 11/04; C01G 17/00
[52] U.S. Cl. ......................................... 423/89; 423/24; 423/99; 423/139
[58] Field of Search ...................... 423/89, 99, 24, 139

[56] References Cited

U.S. PATENT DOCUMENTS 4,389,379  6/1983  Bauer et al. .......................... 423/89

Primary Examiner—Edward J. Meros
Assistant Examiner—Wayne A. Langel
Attorney, Agent, or Firm—Fred Philpitt

[57] ABSTRACT

Germanium is separated from an aqueous solution by means of a substituted 8-hydroxyquinoline extractant.

Re-extraction of germanium from the extractant is carried out above 40° C. and with an organic phase: aqueous phase volume ratio less than 1, whereby obtaining a high re-extraction yield.

11 Claims, 1 Drawing Figure

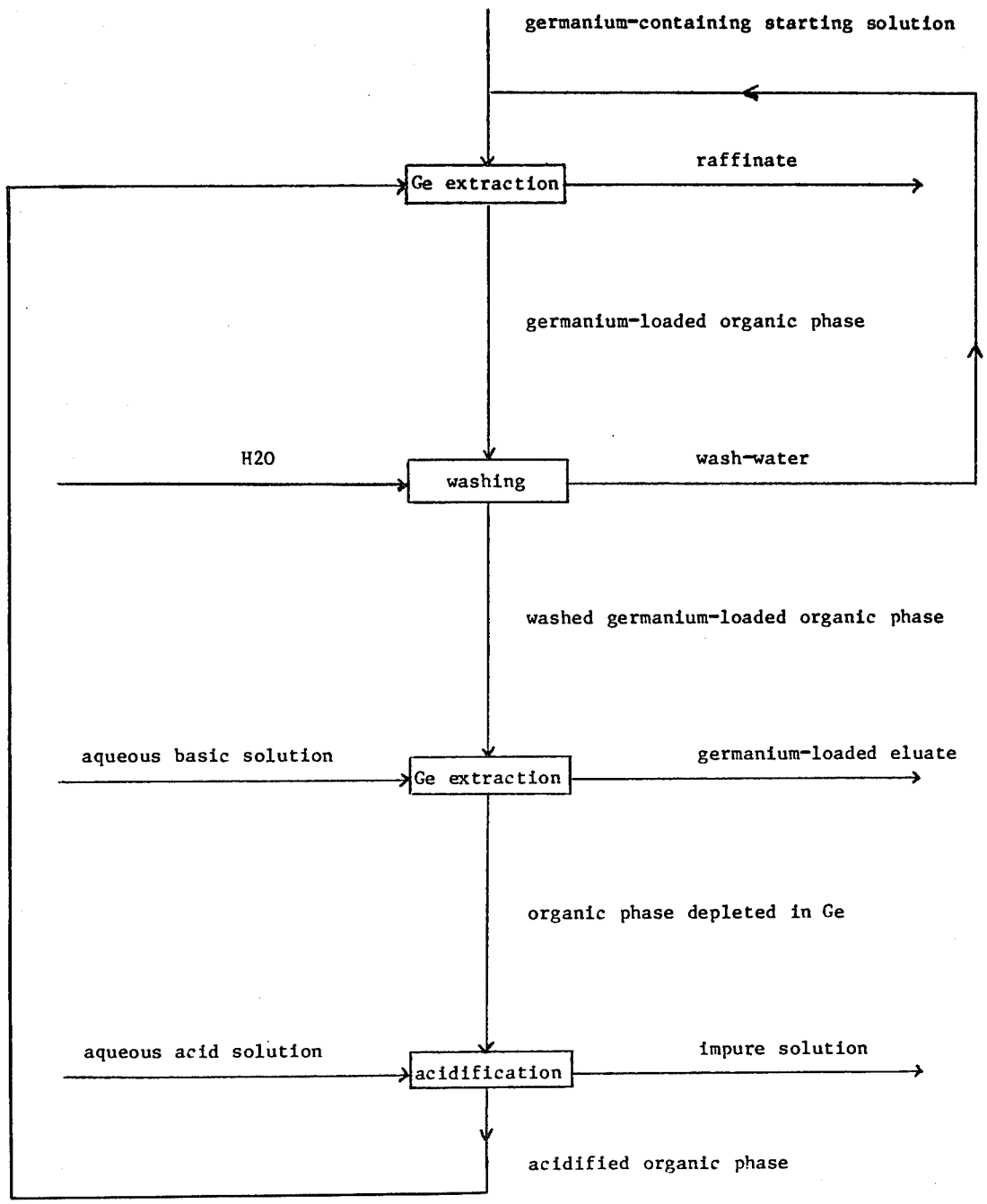

PROCESS FOR SEPARATING GERMANIUM FROM AN AQUEOUS SOLUTION

This application is a continuation of application Ser. No. 285,580, filed July 21, 1981, now abandoned.

The present invention relates to a process for separating germanium from a germanium-containing aqueous acid solution according to which
(a) the solution is contacted with an organic liquid containing a substituted 8-hydroxyquinoline thereby producing a germanium-loaded organic phase and an aqueous phase depleted in germanium,
(b) the germanium-loaded organic phase is separated from the aqueous phase depleted in germanium,
(c) the germanium-loaded organic phase is contacted with an aqueous basic solution, thereby producing an organic phase depleted in germanium and a germanium loaded basic aqueous phase, and
(d) the organic phase depleted in germanium is separated from the germanium-loaded basic aqueous phase.

Such a process is described in the review "Hydrometallurgy" 1980, No. 5, p. 149–160. In this known process one operates at room temperature and one uses in step (c) a volumetric ratio between the organic phase and the aqueous phase which is higher than 1, e.g. a ratio equal to 15 or 24. The drawback of this known process is to require a long lasting contact to realize step (c) and a long lasting decantation to realize step (d).

The aim of the present invention is to provide a process as defined before, avoiding the drawbacks of the known process.

THE DRAWING

The single drawing is a flow sheet representing a preferred mode of carrying out the process of the present invention.

Therefore, according to the invention, steps (c) and (d) are carried out at a temperature above 40° C. and in step (c) an organic phase: aqueous phase volume ratio less than 1 is used.

This ratio is advantageously realized by recycling a fraction of the aqueous phase resulting from step (d) to step (c), which allows producing in step (d) a concentrated germanium-loaded aqueous phase.

The best results are generally obtained when steps (c) and (d) are realized at a temperature of between 45° and 60° C. and when in step (c) the volume ratio between the organic phase and the aqueous phase (hereafter called O:A ratio) is between 0.9 and 0.5.

The substituted 8-hydroxyquinoline used in the process of the invention has the general formula:

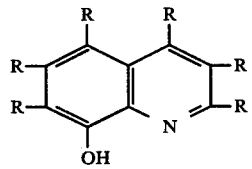

where R is hydrogen or a hydrocarbyl group such as alkyl, alkenyl, cycloaliphatic, aryl or a combination thereof (e.g. alkaryl, aralkenyl, alkylcycloalkyl, aralkyl, etc.) at least one of the Rs being such a hydrocarbyl group. Among the compounds of that general formule, the 7-alkenyl-8-hydroxyquinolines, a large number of which are described in the U.S. Pat. No. 3,637,711, are the most interesting ones. There may e.g. be used a 7-alkenyl-8-hydroxyquinoline, the alkenyl group of which is composed of

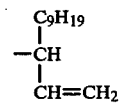

and which is sold by the firm Sherex under the trade mark "Kelex 100". There may also be used a 7-alkenyl-8-hydroxyquinoline sold by the firm Henkel under the trade mark "LIX 26".

It should be noticed that the substituted 8-hydroxyquinolines are generally used in a diluted state. The organic liquid used in step (a) thus contains, besides the substituted 8-hydroxyquinoline, an inert diluent such as kerosene. This organic liquid can moreover contain an agent that avoids the formation of emulsion such as a long chain aliphatic alcohol. The applicants have found that the best results are obtained with an organic liquid having a substituted 8-hydroxyquinoline content from 1 to 20 percent in volume, since the extraction capacity of the organic liquid is too small below 1 percent, whereas the organic liquid becomes too viscous over 20 percent.

It should be noticed that part of the acid present in the germanium containing starting solution is coextracted with germanium by the organic liquid in step (a), if this organic liquid was not previously acidified, i.e. contacted with an acid solution. Hence, the aqueous phase depleted in germanium produced in step (a) has a weaker acidity than the aqueous starting solution, if there was no prior acidification of this organic liquid.

When the starting solution contains metals such as copper, zinc and trivalent iron, which are coextracted with germanium by the organic liquid in step (a), i.e. metals, which, like germanium, are extracted in an acid medium by a substituted 8-hydroxyquinoline, it is particularly advantageous to take care that the acidity of the aqueous phase depleted in germanium, produced in step (a) (and separated in step (b)), shall not be lower than 1 N. When indeed this acidity is lower than 1 N, the coextraction of elements such as Cu, Zn and Fe is important.

A very high acidity of e.g. 8 N does not impede at all in step (a). Very acid germanium-containing aqueous solutions can thus be treated by the process of the present invention. The only drawback resulting from the treatment of very acid solutions, lies in the fact that much acid has to be neutralized later on in step (c). For this reason it is not indicated to use an aqueous starting solution, the acidity of which is higher than 2 N, unless the conditions for preparing the starting solution, e.g. by lixiviation of a germaniferous material, impose an acidity higher than 2 N.

When the starting solution is free from metals, which are extracted in acid medium by a substituted 8-hydroxyquinoline, one operates preferably in such a way that the acidity of the aqueous phase depleted in germanium, produced in step (a), is about 0.1 N. In this way a good extracting yield is obtained for germanium and not much acid has to be neutralized in step (c).

If one wishes to produce in step (a) an aqueous phase depleted in germanium with a predetermined acidity, an organic liquid, that was not acidified before, can be used, in which case however either an aqueous starting solution should be used, the acidity of which is considerably higher than said predetermined acidity, or acid should be added during step (a). To reach the same object it is, however, more advantageous to use an organic liquid acidified before and a starting solution, the acidity of which is not considerably different from said predetermined acidity, as will be explained further.

It is very useful to provide between steps (b) and (c) a washing operation, that consists in contacting the germanium-loaded organic phase with water. In this way, part of the acid contained in the organic phase is re-extracted therefrom, which part otherwise had to be neutralized in step (c). If the germanium-loaded organic phase contains copper, zinc and/or iron, part of this copper and iron and almost all of this zinc (more than 95 percent) is also re-extracted. So, by this washing operation one produces, on the one hand, a partly desacidified and partly purified germanium-loaded organic phase and, on the other hand, an impure acid aqueous phase. After separation of these phases, the organic phase is sent to step (c) and the aqueous phase can be added to starting solution that still has to go through step (a).

In step (c) the germanium and the acid contained in the organic phase are selectively separated therefrom. If the organic phase to be treated in step (c) contains copper and/or iron, these elements are not separated from the organic phase in step (c).

The organic phase depleted in germanium that results from step (d) and that may contain elements such as Cu and Fe, can be recycled just as it is towards step (a). It is, however, preferable to acidify this organic phase before its recycling, by bringing it in contact with an acid aqueous solution, since during this operation copper and iron pass from the organic phase into the aqueous phase; thus after separation of both phases, an epurated organic phase can by recycled.

A preferred mode of carrying out the process of the invention is illustrated by the accompanying flow-sheet. It comprises essentially the following liquid-liquid extraction operations: germanium extraction from the starting solution, washing of the germanium-loaded organic phase, germanium re-extraction from the washed germanium loaded organic phase and acidification of the unloaded organic phase. Each of these operations can be carried out in a conventional liquid-liquid extraction apparatus, for instance in a mixer-settler when the operation is carried out in one stage or in a mixer-settler battery when the operation is carried out in several stages. Mixer-settlers or similar apparatuses, used for re-extracting the germanium from the germanium-loaded organic phase, are adapted to recycle aqueous phase from the decantation compartment to the mixing compartment. Such a mixer-settler apparatus is described in the published European patent application No. 0031 172.

It should be noticed that the process of the present invention is particularly useful for separating germanium from copper-bearing aqueous solutions. As a matter of fact it also enables to treat copper-free solutions, but in that case it is more indicated to use the process described in the U.S. Pat. application, Ser. No. 285,581 entitled "Process for separating germanium from an aqueous solution by means of an alphahydroxyoxime" and filed on the same day as the present application by the applicants of the present application.

EXAMPLE 1

This example relates to the separation of germanium from a germanium-containing aqueous solution according to the process of the invention.

The starting solution contains in g/l: 2.4 Ge; 25 $Fe^{3+}$; 23 Zn; 0.8 Cu; 60 $H_2SO_4$.

The organic liquid is composed of a solution of 10 percent in volume of "LIX 26" and of 25 percent in volume of isodecanol in kerosene, and it contains 10 g/l of $H_2SO_4$.

The extraction of germanium is carried out counter-currently, at ambient temperature, in 5 stages and with a O:A ratio equal to 1:2.

In this way a germanium-loaded organic phase and a raffinate that is almost free from germanium are obtained. The organic phase contains in g/l: 4.78 Ge; 1.95 $Fe^{3+}$; 0.42 Zn; 0.45 Cu; 4 $H_2SO_4$. The raffinate contains in g/l: 0.006 Ge; 24.02 $Fe^{3+}$; 22.79 Zn; 0.57 Cu; 63 $H_2SO_4$.

The germanium loaded organic phase is washed with water. This operation is carried out counter-currently, at ambient temperature, in 2 stages and with a O:A ratio of 10:1.

In this way a washed germanium-loaded organic phase and an acid wash-water are obtained. The washed germanium-loaded organic phase contains in g/l: 4.718 Ge; 0.5 $H_2SO_4$. The acid wash-water contains in g/l: 0.7 Ge; 3.5 Fe; 4 Zn; 0.9 Cu; 35 $H_2SO_4$.

Germanium is re-extracted from the washed germanium-loaded organic phase with an aqueous solution of NaOH containing 150 g/l of NaOH. This operation is carried out counter-currently, at 52° C., in 5 stages and with an apparent O:A ratio of 7:1, which means that 0.143 liter of fresh NaOH solution is used per liter of organic phase. At each stage however so much aqueous phase is recycled from the settling compartment to the mixing compartment that a real O:A ratio of 0.9 is realized in each of the mixing compartments.

In this way an organic phase depleted in germanium and a germanium loaded eluate are obtained. The organic phase depleted in germanium contains in g/l: 0.02 Ge. The germanium-loaded eluate contains in g/l: 32.88 Ge. The total Fe, Zn and Cu content of this eluate is lower than 0.002 g/l.

The organic phase depleted in germanium is acidified with an aqueous solution of $H_2SO_4$ containing 250 g/l of $H_2SO_4$. This operation is carried out at ambient temperature, in one stage and with a O:A ratio of 5:1.

In this way a regenerated organic phase and an impure aqueous solution are obtained. The regenerated organic phase contains in g/l: 0.019 Ge and 10 $H_2SO_4$. The impure aqueous solution contains in g/l: 0.002 Ge; 8 $Fe^{3+}$; 0.1 Zn; 1.8 Cu, 120 $H_2SO_4$.

EXAMPLE 2

This example deals with a test for re-extracting germanium from a washed germanium-loaded organic phase, composed of a solution of 10 percent in volume of "Kelex 100" and of 25 percent in volume of isodecanol in kerosene and containing 4.01 g of Ge per liter and 1.1 g of $H_2SO_4$ per liter.

The re-extraction of germanium is carried out in the way described in example 1, but instead of operating at 52° C. one operates at 35° C.

It is stated that the mixture of phases leaving the mixing compartments becomes ever more viscous and that the decantation time becomes ever longer, about 90 minutes (instead of 7 minutes in example 1).

After these 90 minutes the organic phase is still gelatinous and still contains 1.7 g of Ge per liter, while the aqueous phase still contains 1,500 ppm of organic phase.

After 7 hours of operation, the installation had to be stopped.

EXAMPLE 3

This example deals with a test for re-extracting germanium from a washed germanium-loaded organic phase identical to the one used in example 2.

The re-extraction of germanium is carried out in the way described in example 1, but instead of realizing in each mixing compartment a real O:A ratio of 0.9, a real O:A of 1.2 is realized.

It is stated that the phases separate with difficulty. In order to obtain a clear separation of the phases, they have to be centrifugalized. The centrifugalized organic phase still contains 2.9 g of Ge per liter, what means that only 27 percent of the Ge contained in the washed germanium-loaded organic phase was re-extracted.

In the long run, a precipitate of $Na_2Ge_2O_7 \cdot xH_2O$ is formed in the organic phase and the installation has to be stopped.

EXAMPLE 4

Just like example 3, this example deals with a test for re-extracting germanium from a washed germanium-loaded organic phase identical to the one used in example 2.

The re-extraction of germanium is carried out in the way described in example 1, but instead of operating at 52° C. one operates at 45° C.

It is stated that the settling time is inferior to 20 minutes. The decanted aqueous phase contains less than 100 ppm of organic phase; it contains 27.9 g of Ge per liter. The decanted organic phase contains only 0.022 g of Ge per liter.

When comparing the results of the tests described in the examples 2 to 4, it is stated that, to reach a satisfactory germanium re-extraction it is essential to operate with a O:A ratio lower than 1 and at a temperature higher than 40° C.

We claim:

1. A process for separating germanium from a germanium-containing aqueous acid solution, comprising the steps of (a) contacting said solution with an organic liquid including a substituted 8-hydroxyquinoline, thereby producing a germanium-loaded organic phase and an aqueous phase depleted in germanium;

(b) separating said germanium-loaded organic phase from said aqueous phase depleted in germanium, (c) contacting at a temperature above 40° C. said germanium-loaded organic phase with an aqueous basic solution, the organic phase: aqueous phase volume ratio being less than 1, thereby producing an organic phase depleted in germanium and a germanium-loaded basic aqueous phase; and (d) separating at a temperature above 40° C. said organic phase depleted in germanium from said germanium-loaded basic aqueous phase.

2. A process according to claim 1 further comprising the step of recycling a fraction of the aqueous phase resulting from step (d) to step (c).

3. A process according to claim 1 or 2 wherein steps (c) and (d) are performed at a temperature of between 45° and 60° C.

4. A process according to claim 1 wherein said ratio is between 0.9 and 0.5.

5. A process according to claim 1 wherein said germanium-containing aqueous acid solution includes co-extractable elements, and further wherein the acidity of said aqueous phase depleted in germanium is at least 1 N.

6. A process according to claim 5 wherein said germanium-containing aqueous acid solution includes copper.

7. A process according to claim 1 wherein said germanium-containing aqueous acid solution is free from co-extractable elements, and further wherein the acidity of said aqueous phase depleted in germanium is about 0.1 N.

8. A process according to claim 1, further comprising the step of washing said germanium-loaded organic phase separated in step (b) with water.

9. A process according to claim 1, further comprising the step of acidifying said organic phase depleted in germanium separated in step (d).

10. A process according to claim 1 wherein said organic liquid includes from 1 to 20 percent in volume of the substituted 8-hydroxyquinoline.

11. A process according to claim 1 wherein said substituted 8-hydroxyquinoline is a 7-alkenyl-8-hydroxyquinoline.

* * * * *